3,453,214
METHOD OF CESIUM 137 REMOVAL
André Bonnin, Courbevoie, and Philippe Poirier, Garges-les-Gonesse, France, assignors to Societe Saint-Gobain Techniques Nouvelles, Courbevoie, France, an organization of France
No Drawing. Filed Feb. 14, 1967, Ser. No. 615,914
Int. Cl. G21f *9/12;* B01d *15/04;* C01d *11/04*
U.S. Cl. 252—301.1                                                 6 Claims

ABSTRACT OF THE DISCLOSURE

A method of removing cesium which is primarily applicable to the separation of cesium from radioactive effluents. The solution from which cesium is to be separated is passed through a column loaded with mixed ferrocyanide which has been previously adsorbed on an anionic resin or on a glass fiber bed.

BACKGROUND OF THE INVENTION

As is already known, cesium can be removed from solutions in which it is present by forming in said solutions a precipitate of mixed ferrocyanide on which cesium is adsorbed. Such ferrocyanides can be represented by the formula $[Fe(CN)_6]_x M_y A_z$ wherein M is a transition element and A is an alkali metal. In the case, for example, of a ferrocyanide of nickel, the reaction is as follows:

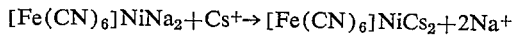

$$[Fe(CN)_6]NiNa_2 + Cs^+ \rightarrow [Fe(CN)_6]NiCs_2 + 2Na^+$$

One disadvantage of this method lies in the fact that the minimum quantity of reagents which makes it possible to obtain a precipitate is proportional, not to the quantity of cesium to be removed which is very small in a large number of nuclear effluents, but to the volume of solutions to be processed. As a consequence, the process entails a consumption of reagents and a capital outlay which are both of a relatively high order, and further results in large volumes of active sludges.

In order to circumvent this difficulty, it has been proposed to separate cesium by liquid-liquid extraction. This process consists in maintaining in an organic phase a stable colloidal suspension of an insoluble ferrocyanide. The mineral colloid in organic phase is prepared from a colloidal aqueous phase. This phase is flocculated by means of a cationic surface-active agent. The flocculate is extracted from the aqueous phase into the organic phase. The colloid in organic phase retains its cesium adsorption properties and makes it possible to extract cesium from effluents by liquid-liquid extraction. This process has been disclosed in U.S. patent application Ser. No. 352,345 of Mar. 16, 1963 and now abandoned and in U.S. patent application Ser. No. 400,204 of Sept. 29, 1964 and now U.S. Patent No. 3,375,202 as filed in the name of the present applicant.

This invention proposes a method of removal of cesium–137 which can be carried into practice in a particularly rapid and simple manner.

The method according to the invention consists in passing the solution from which cesium is to be separated through a column loaded with a mixed ferrocyanide which has been previously adsorbed on a carrier.

In a first mode of execution of the method, the ferrocyanide is adsorbed on an ion exchange resin. In a second mode of execution, the ferrocyanide is incorporated in a glass fiber bed.

Different anionic resins can be employed for the adsorption of the ferrocyanide. Preference will be given to a risin which has a good macroporous structure and which can be readily crushed and screened. One type of resin which is particularly well suited to this purpose is the resin known as Amberlyst.

The adsorption of the ferrocyanide on the resin comprises saturating said resin with the ferrocyanide ion and adsorbing transition elements on the ferrocyanide. Copper and nickel are representative members of the first series of transition elements which includes scandium, titanium, vanadium, chromium, manganese, cobalt, nickel, copper and zinc. Reference will be made hereinafter mainly to copper ferrocyanide, although it will be understood that all of the ferrocyanides of the transition elements have a good cesium adsorption capacity and can be incorporated in the resin in the same manner as copper ferrocyanide.

In order to load the resin with copper ferrocyanide, the procedure is as follows. The resin is contacted with a saturated solution of potassium ferrocyanide. The resin is then centrifuged and a saturated solution of copper chloride is then poured thereon. This addition is advantageously performed in the presence of potassium chloride, a high potassium ion concentration having the effect of increasing the cesium adsorption capacity of the product obtained. The resin then assumes the colored tinge of copper ferrocyanide. The contacting time is, for example, of the order of 24 hours but shorter times do lead to utilizable products. The resin is centrifuged and the excess copper is removed by washing. After drying, the resin is ready for the purpose of filling the column.

The cesium adsorption capacity of the resin depends on the quantity of ferrocyanide which has been incorporated therein. By way of example, in the case of resin beads having a diameter of 0.1 to 0.2 mm., the quantity of ferrocyanide adsorbed was 2.48 meq./g. and the corresponding quantity of copper was 1.6 meq./g., the resin being weighed in the dry state.

In accordance with the mode of execution which consists in incorporating the ferrocyanide in a glass fiber bed, use is made of glass fiber cakes which are prepared, for example, by the method described in French Patent No. 1,452,805 as granted to the present applicant on Aug. 3, 1965.

The incorporation of ferrocyanide in the glass fiber cake can be effected either at the time of formation of the cake or afterwards.

In the first case, the ferrocyanide is precipitated in the presence of glass fibers which have previously been dispersed in the column. The suspension is sucked through a grid on which the cake forms. An alternative form of this process consists in making use of ground glass fiber and in sucking the ferrocyanide and glass fibers through a grid or even more simply in filtering the aggregate. These packings or "wads" have an advantage in that they can be formed directly within the extraction column without requiring further handling, but are nevertheless of low mechanical strength.

In the second case, the glass fiber cake is immersed in a bath containing a copper ferrocyanide precipitate which must be in a finely divided state in order to ensure that the cake is impregnated right through. The precipitation is carried out preferably at room temperature. After immersion, the impregnated cake is lightly centrifuged and then dried at 100° C. By way of example, a glass fiber cake of type FF4 (fiber having a mean diameter of 4 microns) was immersed in a bath of copper ferrocyanide having a concentration of $3.10^{-2}$ M. The cake was dried at 100° C. The quantity of copper ferrocyanide retained was equal to 20% of the final weight of the cake. Its specific gravity was 0.086. Its cesium-adsorption capacity was 0.06 meq./ml. of volume of cake, namely 300 mc./ml. of cesium-137.

The method last mentioned is generally preferable inasmuch as it utilizes the smallest quantities of reagents. The ferrocyanide is fixed on the glass fiber at the time of drying. Furthermore, the mesh formed by the intricately crossed fibers has the effect of retaining any particles which might otherwise have a tendency to become detached from their carrier.

Good results are obtained, both from the point of view of homogeneous distribution of the reagent and from the point of view of low depletion of the cake after impregnation and drying, by incorporating with the glass fiber bed a quantity of ferrocyanide of the order of 20% of the final weight of the cake.

The ion exchange resins and glass fiber cakes which are loaded with ferrocyanide according to the method contemplated by the invention have excellent cesium adsorption capacity and, when they are utilized in columns, permit of high rates of passage of the solution from which cesium is to be separated.

There will now be described a number of examples of application of the method according to the invention. Consideration will be given in these examples to the different factors which can exert an influence on the cesium adsorption capacity either of the resin or of the ferrocyanide-loaded glass fiber bed, viz: pH value, presence of reducing salts, rate of passage of the solution to be processed.

The practical arrangements which will be described in connection with these examples must be considered as forming part of the invention, it being understood that any equivalent arrangements could equally well be adopted without thereby departing from the scope of the invention.

In Example 1, consideration is given to the influence of pH value and of salts on the cesium distribution equilibria between a solution and the resin.

In Example 2, consideration is given to the variations in extraction yield as a function of the rate of passage of the cesium solution.

Example 3 illustrates the utilization of a resin which is loaded with nickel ferrocyanide for the separation of cesium.

Examples 4 and 5 describe a mode of application of the method starting from, on the one hand, a solution containing cesium-137 alone and, on the other hand, a solution containing cesium-137 and sodium nitrate.

Example 6 illustrates the separation of cesium-137 from a solution by passing this latter through a column which is filled with glass fiber wads loaded with copper ferrocyanide.

Examples 7 and 8 relate to one application of the method to the extraction of cesium from radioactive effluents.

Example 1

The distribution coefficient $K_D$ defined by $$K_D = \frac{\text{activity in 1 g. of resin}}{\text{activity in 1 ml. of solution}}$$

at equilibrium has been determined in respect of 0.1 g. of resin having a particle diameter of 0.1 to 0.2 mm. and 10 ml. of solution. The activity of cesium-137 employed corresponded to $1.9 \cdot 10^6$ pulses per min. The influence of the pH value on this distribution coefficient has been studied. The results obtained are as follows:

|  | pH | $K_D$ | $10^6$ |
|---|---|---|---|
| Nitric acid | 1 | 0.13 | |
|  | 3.2 | 0.29 | |
|  | 3.9 | 0.83 | |
| Acetic acid buffer | 4.9 | 1.17 | |
|  | 5.8 | 1.24 | |
|  | 7 | 0.94 | |
| Without buffer | 7 | 1.03 | |
| NaOH | 9 | 4.83 | |

The acetic acid buffer is obtained by suitable mixing of 2 M acetic acid with 2 M sodium acetate.

It is apparent that the maximum cesium adsorption is located above pH 5 and that the coefficient $K_D$ remains very high at pH 1.

The influence of salts on the distribution coefficient $K_D$ has also been studied:

| Salts | $K_D$ | $10^6$ |
|---|---|---|
| 3 M $NaNO_3$ | 0.46 | |
| $UO_2(NO_3)_2$ | 1.66 | |
| 200 mg./l | | |
| Fe | | |
| 50 mg./l | 2.04 | |

It is observed that, even in a 3 M sodium nitrate medium, the coefficient $K_D$ remains a high value.

Example 2

A solution of cesium-137 was passed in fractions of 50 ml. at different flow rates through a resin column 2 cm.² in cross-sectional area and 2.5 cms. in height (namely 2 g. of dry resin) on which copper ferrocyanide was adsorbed:

| Throughput ml./cm.²/minute: | Extraction yield percent |
|---|---|
| 4 | 100 |
| 7.5 | 99 |
| 30 | 99 |
| 60 | 97 |

It is apparent that the cesium extraction yield is still 99% in respect of a column throughput of 1800 ml./cm.²/hr.

Example 3

Resin of the type known as Amberlyst 27 having particle or bead diameters of 0.1 to 0.2 mm. was saturated with ferrocyanide anions, then contacted over an extended period of time with a saturated solution of nickel chloride. There was formed with the resin thus treated a bed 2 cms. in diameter and 1.5 cms. in depth.

There were then passed through the column 50 ml. of a solution of cesium-137 having a total activity of 350,000 pulses per min. The total activity of the eluate was 500 pulses per min., which corresponds to a decontamination factor $F_D$ of 700.

Example 4

A solution of cesium-137 is passed through a resin column having a cross-sectional area of 2 cm.² and a height of 10 cms. (namely 20 ml. of resin) at a rate or throughput of 100 ml./cm.²/hr. (namely 200 ml./hr.).

60 liters of effluents were processed. The results obtained are recorded in the following table:

| Partial volumes (liters) | Total volume (liters) | Initial activity, pulses per min. | Residual activity, pulses per min. |
|---|---|---|---|
| 0.1 | | 3,891 | 0 |
| 1 | | | 0 |
| 4 | | | 0 |
| 5.3 | | | 21 |
| 8.6 | | | 30 |
| 9.9 | | | 17 |
| 12.9 | | | 45 |
| 14.3 | | | 15 |
| 18 | | | 43 |
| 19.2 | | | 31 |
| 22.2 | | | 7 |
| 23.3 | | | 21 |
| 25 | 25 | | 19 |
| 1.8 | | 4,463 | 18 |
| 4.8 | | | 8 |
| 6.3 | | | 21 |
| 9.6 | | | 77 |
| 11 | | | 28 |
| 14 | | | 25 |
| 14.9 | | | 7 |
| 16 | | | 10 |
| 18.8 | | | 15 |
| 20 | | | 14 |
| 23.5 | | | 21 |
| 25 | 50 | | 7 |
| 3.1 | | 3,991 | 13 |
| 4.1 | | | 15 |
| 6.3 | | | 11 |
| 7.6 | | | 12 |
| 10 | 60 | | 9 |

After processing of 60 l. of effluents (3,000 volumes of bed) and adsorption of 2.4 mc., the extraction yield was 99.7%. If the mean value of the results obtained in the last fraction of 10 liters is used as a basis, this corresponds to a decontamination factor $F_D$ which is higher than 300.

Example 5

25 liters of a 2 M sodium nitrate solution containing cesium–137 were passed through a resin column 2.5 cm.$^2$ in cross-sectional area and 10 cms. in height with a throughout of 100 ml./cm.$^2$/hr.

The activity of the solution corresponded to 6,718 pulses per ml. per min.

Volume passed through column (liters):     Residual activity pulses/min./ml.
- 4 — 300
- 5.7 — 297
- 9.7 — 95
- 11.3 — 83
- 12.9 — 31
- 16.5 — 57
- 17.9 — 29
- 21.6 — 13
- 23.1 — 11
- 25 — 14

If the above results are compared with those obtained in the previous example, it is noted that a high percentage of sodium nitrate does not prevent adsorption of cesium. These results indicate the feasibility of the method for the purpose of removing cesium from radioactive effluents which are frequently loaded with sodium nitrate.

Example 6

A column having a cross-sectional area of 2.5 cm.$^2$ is filled to a depth of 10 cms. with glass fiber packings or "wads." These wads were obtained by simultaneous suction of a copper ferrocyanide precipitate and glass fibers. The concentration of copper ferrocyanide was 7 g./l. The concentration of glass fiber, type FF4, was 1/1,000 relative to water. The bath was sucked through a stainless stell grid by means of a rotary pump. The cake finally obtained was dried at 100° C.

By means of this column, 50 l. of a solution of cesium–137 were processed with a throughput of 100 ml./cm.$^2$/hr.

| Partial volumes (liters) | Total volume (liters) | Initial activity, pulses/ml./min. | Residual activity, pulses/ml./min. |
|---|---|---|---|
| 0.4 | | 7,500 | 19 |
| 4 | | | 76 |
| 5.5 | | | 69 |
| 6.8 | | | 57 |
| 9.4 | | | 25 |
| 10.4 | | | 51 |
| 13.2 | | | 55 |
| 14.6 | | | 29 |
| 17.6 | | | 31 |
| 19.1 | | | 87 |
| 22.4 | | | 44 |
| 23.8 | | | 93 |
| 25 | 25 | | 47 |
| 3.7 | | 6,850 | 191 |
| 5.2 | | | 143 |
| 8.5 | | | 103 |
| 10 | | | 95 |
| 14.2 | | | 136 |
| 15.4 | | | 257 |
| 19 | | | 87 |
| 20.5 | | | 276 |
| 22.2 | | | 51 |
| 25 | 50 | | 63 |

After processing 50 l. of effluent (2,000 volumes of bed), the decontamination factor is again higher than 100.

Example 7

An effluent having a medium activity and a pH value of 8.3 was processed, said effluent having a high sodium nitrate content (24 g./l.). The distribution of gamma-ray activity was as follows:

Percent
- Nb+Zr — 5
- Ce — 1
- Ru — 15
- Cs — 75

The resin employed was Amberlyst 27 loaded with copper ferrocyanide. Its particle size varied between 0.1 and 0.2 mm. The column had a cross-sectional area of 3 cm.$^2$, a height of 10 cms. (corresponding to 30 ml. of resin). The solution was filtered at the top of the column through a glass fiber packing.

The treatment of the effluent was also performed by means of a column filled with a glass fiber bed loaded with copper ferrocyanide. The column had a cross-sectional area of 3 cm.$^2$ and a height of 10 cms., and was constituted by a stack of wads of glass fiber, type FF4, containing copper ferrocyanide. These wads were formed by simultaneous suction of dispersed fibers and a precipitate of copper ferrocyanide, as described in the previous example. The cesium adsorption capacity of this product was 0.06 meq./ml., namely 300 mc./ml. of cesium–137.

The rates of passage of the effluent through the columns were 100 ml./cm.$^2$/hr., namely 300 ml./hr. in the case of each column. The experiment was continued over a period of five and one-half months, 9.4 mc. of cesium were adsorbed in each column.

The results obtained are grouped in the following table:

| Resin | | Glass Fibers | |
|---|---|---|---|
| Volume passed through column (liters) | Residual activity, pulses/ml./min. | Volume passed through column (liters) | Residual activity, pulses/ml./min. |
| 45 | 7 | 19 | 12 |
| 73 | 7 | 45 | 5 |
| 116 | 6 | 66 | 6 |
| 164 | 12 | 112 | 4 |
| 214 | 7 | 166 | 6 |
| 264 | 5 | 208 | 6 |
| 311 | 5 | | |
| 357 | 8 | 312.5 | 15 |
| 396 | 8 | 358 | 7 |
| 447 | 12 | 396.5 | 11 |
| 470 | 3 | 470 | 4 |
| Mean value of $F_D$=486 | | Mean value of $F_D$=460 | |

Example 8

A similar test to that described in the previous example was performed, but by increasing the rate of passage of the effluent through the column. The effluent under treatment contained (per liter) 24 g. of sodium nitrate and 20 μc. of cesium.

The resin column employed was identical with the column of Example 7. The column containing the glass fibers was constituted by glass fiber wads prepared by the method of direct impregnation of cakes in a copper ferrocyanide bath. These cakes contained 19% copper ferrocyanide with respect to the final weight of the cakes.

The rate of passage of the solution to be processed through the columns was 500 ml./hr./cm.$^2$, namely 1500 ml./hr. for each column. 470 l. of solution, namely 15,666 volumes of bed were processed in each case.

The results obtained were as follows:

| Resin | | Glass Fibers | |
| --- | --- | --- | --- |
| Volume passed through column (liters) | Residual activity, pulses/ml./min. | Volume passed through column (liters) | Residual activity, pulses/ml./min. |
| 33 | 0 | 36 | 0 |
| 64 | 1 | 70 | 7 |
| 96 | 0 | 113 | 7 |
| 128 | 13 | 147 | 6 |
| 171 | 1 | 198 | 0 |
| 194 | 1 | 242 | 9 |
| 228 | 0 | 275 | 0 |
| 263 | 3 | 308 | 0 |
| 307 | 0 | 342 | 2 |
| 341 | 0 | 388 | 6 |
| 373 | 5 | 422 | 0 |
| 420 | 4 | 455 | 3 |
| 470 | 5 | 470 | 1 |
| $F_D$ (mean)=1,600 | | $F_D$ (mean)=1,333 | |

It is apparent that, for a throughput of 500 ml./cm.$^2$/hr., the extraction yield is still very good inasmuch as it has proved possible to process 470 liters of effluent, namely more than 15,000 volumes of bed in each column, with a mean distribution coefficient $F_D$ which is higher than 1300.

What we claim is:

1. A method for removing cesium 137 from radioactive effluents containing said cesium which comprises passing said effluent through a column loaded with a carrier having adsorbed thereon a mixed ferrocyanide of a transition element selected from the group consisting of scandium, titanium, vanadium, chromium, manganese, cobalt, nickel, copper and zinc, and an alkali metal.

2. A method according to claim 1 wherein said carrier is an anionic resin.

3. A method according to claim 1 wherein said carrier is a glass fiber bed.

4. A method according to claim 1 wherein said transition element is copper.

5. A method according to claim 1 wherein said transition element is nickel.

6. A method according to claim 3, wherein that quantity of ferrocyanide incorporated in the glass fiber bed is of the order of 20% of the final weight of bed.

References Cited

UNITED STATES PATENTS 3,375,202  3/1968  Laveissiere et al. ____ 252—301.1

BENJAMIN R. PADGETT, *Primary Examiner.*

M. J. SCOLNICK, *Assistant Examiner.*

U.S. Cl. X.R.

23—293, 337; 210—24